US012754466B2

(12) United States Patent
Hikmet et al.

(10) Patent No.: US 12,754,466 B2
(45) Date of Patent: Oct. 6, 2026

(54) INCREASED RED CONTENT IN HIGH CRI HIGH BRIGHTNESS LIGHT SOURCE

(71) Applicant: SIGNIFY HOLDING B.V., Eindhoven (NL)

(72) Inventors: Rifat Ata Mustafa Hikmet, Eindhoven (NL); Ties Van Bommel, Horst (NL)

(73) Assignee: SIGNIFY HOLDING B.V., Eindhoven (NL)

(*) Notice: Subject to any disclaimer, the term of this patent is extended or adjusted under 35 U.S.C. 154(b) by 452 days.

(21) Appl. No.: 18/024,282

(22) PCT Filed: Sep. 10, 2021

(86) PCT No.: PCT/EP2021/074961
§ 371 (c)(1),
(2) Date: Mar. 2, 2023

(87) PCT Pub. No.: WO2022/063608
PCT Pub. Date: Mar. 31, 2022

(65) Prior Publication Data
US 2024/0027887 A1 Jan. 25, 2024

(30) Foreign Application Priority Data
Sep. 22, 2020 (EP) .................................... 20197449

(51) Int. Cl.
*H01Q 3/02* (2006.01)
*G03B 21/20* (2006.01)

(52) U.S. Cl.
CPC ....... *G03B 21/206* (2013.01); *G03B 21/2013* (2013.01); *G03B 21/204* (2013.01); *G03B 21/2066* (2013.01); *H01Q 3/02* (2013.01)

(58) Field of Classification Search
None
See application file for complete search history.

(56) References Cited

U.S. PATENT DOCUMENTS

2011/0310362 A1 12/2011 Komatsu
2013/0163225 A1* 6/2013 Nakatsu ................ G03B 33/06 362/343
(Continued)

FOREIGN PATENT DOCUMENTS

CN 107076400 A 8/2017
CN 109100907 A 12/2018
(Continued)

*Primary Examiner* — Pascal M Bui Pho

(57) ABSTRACT

A light generating system is provided, having one or more pump light sources, a first luminescent material, a second luminescent material, and optics, wherein the first/second luminescent materials convert at least part of the pump light source light into first/second luminescent materials light, the first and second luminescent materials light have different spectral power distributions; the optics comprise first/second wavelength dependent optics which spectrally separate the first luminescent material light into a first part of the first luminescent material light and a second part of the first luminescent material light into two directions; the second wavelength dependent optics spectrally combines the first part of the first luminescent material light, the second part of the first luminescent material light, and the second luminescent material light; and the light generating system is configured to generate system light using the pump light source light and the first/second luminescent material light.

14 Claims, 5 Drawing Sheets

(56) References Cited

U.S. PATENT DOCUMENTS

| | | | | |
|---|---|---|---|---|
| 2014/0347634 | A1* | 11/2014 | Bommerbach | G03B 21/208 353/121 |
| 2015/0146174 | A1 | 5/2015 | Ferri et al. | |
| 2016/0084452 | A1* | 3/2016 | Hikmet | F21V 9/32 362/19 |
| 2016/0161835 | A1 | 6/2016 | Schnarrenberger | |
| 2016/0169459 | A1 | 6/2016 | Van Bommel et al. | |
| 2017/0315431 | A1 | 11/2017 | Schnarrenberger et al. | |
| 2018/0356716 | A1* | 12/2018 | Hashizume | H04N 23/125 |
| 2019/0235369 | A1 | 8/2019 | Janssens et al. | |
| 2020/0363709 | A1* | 11/2020 | Yang | G03B 21/208 |
| 2021/0024818 | A1* | 1/2021 | Kito | C09K 11/02 |
| 2021/0063860 | A1* | 3/2021 | Wong | H04N 9/3111 |
| 2022/0011657 | A1* | 1/2022 | Chen | G03B 21/204 |

FOREIGN PATENT DOCUMENTS

| | | | |
|---|---|---|---|
| CN | 110967909 | A | 4/2020 |
| CN | 111399241 | B | 11/2022 |
| JP | 2008287157 | A | 11/2008 |
| JP | 2011197212 | A | 10/2011 |

* cited by examiner

INCREASED RED CONTENT IN HIGH CRI HIGH BRIGHTNESS LIGHT SOURCE

CROSS-REFERENCE TO PRIOR APPLICATIONS

This application is the U.S. National Phase application under 35 U.S.C. § 371 of International Application No. PCT/EP2021/074961, filed on Sep. 10, 2021, which claims the benefit of European Patent Application No. 20197449.0, filed on Sep. 22, 2020. These applications are hereby incorporated by reference herein.

FIELD OF THE INVENTION

The invention relates to a light generating system as well as to a light generating device comprising such light generating system.

BACKGROUND OF THE INVENTION

Systems to combine beams of light are known in the art. US2019/0235369, for instance, describes a system for solid state illumination comprising at least three solid state light sources, means for color conversion, means for combining light beams, and means for color filtering, a first light source providing a first light beam that is converted by the means for color conversion into at least one converted light beam, a second and a third assisting light source providing a second and third light beam respectively, the second assisting light source being a red light source and the third assisting light source being a blue light source, the at least one converted light beam being combined with the second- and/or third light beam, by the means for combining light beams, into a composed light beam that is filtered by the means for color filtering, wherein the second and third light beams comprise different primary colors, and the spectra of the converted light beam comprises at least one of said primary colors, wherein the optical output of the first light source is constant in time while the optical output of any of the second- and third assisting light sources is modulated in time between 100% and 10% above its lasing threshold.

SUMMARY OF THE INVENTION

High brightness light sources can be used in applications such as projection, stage-lighting, spot-lighting and automotive lighting. For this purpose, laser-phosphor technology can be used wherein a laser provides laser light and a (remote) phosphor converts laser light into converted light. The phosphor may in embodiments be arranged on or inserted in a heatsink for improved thermal management and thus higher brightness.

The easiest way to produce white light using lasers is to use pump light in combination with converted light to produce white light. While white LED sources can give an intensity of e.g. up to about 300 lm/mm$^2$; static phosphor converted laser white sources can give an intensity even up to about 20.000 lm/mm$^2$. Ce doped garnets (e.g. YAG, LuAG) may be the most suitable luminescent convertors which can be used for pumping with blue laser light as the garnet matrix has a very high chemical stability. Further, at low Ce concentrations (e.g. below 0.5%) temperature quenching may only occur above about 200° C. Furthermore, emission from Ce has a very fast decay time so that optical saturation can essentially be avoided. Assuming e.g. a reflective mode operation, blue laser light may be incident on a phosphor. This may in embodiments realize almost full conversion of blue light, leading to emission of converted light. It is for this reason that the use of garnet phosphors with relatively high stability and thermal conductivity is suggested. However, also other phosphors may be applied. Heat management may remain an issue when extremely high-power densities are used.

Problems that may be associated with such (laser) light sources may be the heat management of the phosphor. When e.g. garnet phosphors with high chemical, thermal and light stability are used for producing white light, in the absence of enough red emission only low CRI white light is obtained. In order to increase CRI the use of red emitting phosphors in combination with garnet phosphors is suggested. However, in such a combination red phosphor is heated further as a result of increased temperature of garnet phosphor during its pumping with blue light. Other problems associated with such laser light sources may be the desire to create compact high power devices. Yet further, the combination of different light sources to create an intense light source is not straightforward.

Hence, it is an aspect of the invention to provide an alternative light generating system (or light generating device comprising such system), which preferably further at least partly obviates one or more of above-described drawbacks. The present invention may have as object to overcome or ameliorate at least one of the disadvantages of the prior art, or to provide a useful alternative.

In a first aspect, the invention provides a light generating system ("system"), comprising (i) one or more pump light sources, (ii) a first luminescent material, (iii) a second luminescent material, and (iv) optics. Especially, the one or more pump light sources are configured to generate pump light source light ("pump light"). Further, the first luminescent material may be configured to convert at least part of the pump light source light into first luminescent material light having a first spectral power distribution. Likewise, the second luminescent material may be configured to convert at least part of the pump light source light into second luminescent material light having a second spectral power distribution. Especially, the second spectral power distribution is different from the first spectral power distribution. Further, there may be (partial) spectral overlap of one of the spectral power distributions with the other of the spectral power distributions. In embodiments, the optics comprise a first wavelength dependent optics and a second wavelength dependent optics. In specific embodiments, the first wavelength dependent optics may be configured downstream of the first luminescent material, and may be configured to spectrally separate the first luminescent material light into a first part of the first luminescent material light and a second part of the first luminescent material light into two (different) directions. Yet further, in embodiments the second wavelength dependent optics may be configured downstream of (i) the first wavelength dependent optics and (downstream of) (ii) the second luminescent material. In specific embodiments, the second wavelength dependent optics may be configured to spectrally combine the first part of the first luminescent material light, the second part of the first luminescent material light, and the second luminescent material light. Yet further, in embodiments the light generating system may be configured to generate system light comprising one or more of the pump light source light, the first luminescent material light, and the second luminescent material light. Therefore, in specific embodiments the invention provides a light generating system, comprising (i) one or more pump light sources, (ii) a first luminescent material, (iii) a second luminescent material, and (iv) optics, wherein: (I) the one or more pump light sources are configured to generate pump light source light; (II) the first luminescent material is configured to convert at least part of the pump light source light into first luminescent material light having a first spectral power distribution; (III) the second luminescent material is configured to convert at least part of the pump light source light into second luminescent material light having a second spectral power distribution, different from the first spectral power distribution; (IV) the optics comprise a first wavelength dependent optics and a second wavelength dependent optics; (V) the first wavelength dependent optics is configured downstream of the first luminescent material, and configured to spectrally separate the first luminescent material light into a first part of the first luminescent material light and a second part of the first luminescent material light into two directions; (VI) the second wavelength dependent optics is configured downstream of (i) the first wavelength dependent optics and (ii) the second luminescent material; and wherein the second wavelength dependent optics is configured to spectrally combine the first part of the first luminescent material light, the second part of the first luminescent material light, and the second luminescent material light; and (VII) the light generating system is configured to generate system light comprising one or more of the pump light source light, the first luminescent material light, and the second luminescent material light.

With such system, it is possible to individually control different contributions of light to the system light. Further, with such system it may also be possible to individually tune or control the thermal management of the different phosphors. Yet further, such system allows combination of two or more different light sources to provide system light comprising all the two or more contributions. In this way, a high intensity light source may be created (here indicated as light generating system).

As indicated above, the invention provides light generating system ("system"), wherein the light generating system comprises: (i) one or more pump light sources, (ii) a first luminescent material, (iii) a second luminescent material, and (iv) optics. These are further discussed below.

The one or more pump light sources are configured to generate pump light source light. In embodiments, a single light source may be used, of which the light source light may be used to excite both the first luminescent material and the second luminescent material. For instance, an optical element may be used to split a beam of light source light into two (or more) beams, each essentially having the same spectral power distribution, though other embodiments may also be possible. Alternatively or additionally, two (or more) (different) light sources may be applied, of which the light source light may be used to excite both the first luminescent material and the second luminescent material. In such embodiments, the spectral power distributions of the light source light of the two or more light sources may be the same. However, alternatively the spectral power distributions of the light source light of two or more of the two or more light sources may be different. This may be useful when the two (or more) luminescent material have different excitation spectra, especially different excitation maxima. As the light source(s) are used to irradiate the luminescent material by which luminescent material light is generated, the light source(s) are herein also indicated as "pump light source".

In specific embodiments, part of the light source light may bypass the luminescent material(s), such as when using a separate light source and/or using an optical element which may split part of the light source light in a direction to bypass the luminescent material(s). In this way, the system light may comprise at least part of the light source light. Alternative embodiments in this respect are further discussed below.

Note that in embodiments, in addition to the one or more pump light sources, one or more further light source may be available, of which the light source light may in embodiments be comprised by the system light.

Embodiments of the light source are further described below.

The term "light source" may in principle relate to any light source known in the art. It may be a conventional (tungsten) light bulb, a low-pressure mercury lamp, a high pressure mercury lamp, a fluorescent lamp, a LED (light emissive diode). In a specific embodiment, the light source comprises a solid state LED light source (such as a LED or laser diode). The term "light source" may also relate to a plurality of light sources, such as 2-200 (solid state) LED light sources. Hence, the term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of light semiconductor light source may be configured on the same substrate. In embodiments, a COB is a multi LED chip configured together as a single lighting module.

The light source may have a light escape surface. Referring to conventional light sources such as light bulbs or fluorescent lamps, it may be outer surface of the glass or quartz envelope. For LED's it may for instance be the LED die, or when a resin is applied to the LED die, the outer surface of the resin. In principle, it may also be the terminal end of a fiber. The term escape surface especially relates to that part of the light source, where the light actually leaves or escapes from the light source. The light source may be configured to provide a beam of light. This beam of light may (thus) escapes form the light exit surface of the light source.

The term "light source" may especially refer to a semiconductor light-emitting device, such as a light emitting diode (LEDs), a resonant cavity light emitting diode (RCLED), a vertical cavity laser diode (VCSELs), an edge emitting laser, etc. . . . . The term "light source" may also refer to an organic light-emitting diode, such as a passive-matrix (PMOLED) or an active-matrix (AMOLED). In a specific embodiment, the light source comprises a solid-state light source (such as a LED or laser diode). In an embodiment, the light source comprises a LED (light emitting diode). The term LED may also refer to a plurality of LEDs. Further, the term "light source" may in embodiments also refer to a so-called chips-on-board (COB) light source. The term "COB" especially refers to LED chips in the form of a semiconductor chip that is neither encased nor connected but directly mounted onto a substrate, such as a PCB. Hence, a plurality of semiconductor light sources may be configured on the same substrate. In embodiments, a COB is a multi LED chip configured together as a single lighting module. The term "light source" may also relate to a plurality of (essentially identical (or different)) light sources, such as 2-2000 solid state light sources. In embodiments, the light source may comprise one or more micro-optical elements (array of micro lenses) downstream of a single solid-state light source, such as a LED, or downstream of a plurality of solid-state light sources (i.e. e.g. shared by multiple LEDs). In embodiments, the light source may comprise a LED with on-chip optics. In embodiments, the light source comprises a pixelated single LEDs (with or without optics) (offering in embodiments on-chip beam steering).

In embodiments, the light source may be configured to provide primary radiation, which is used as such, such as e.g. a blue light source, like a blue LED, or a green light source, such as a green LED, and a red light source, such as a red LED.

In other embodiments, however, the light source may be configured to provide primary radiation and part of the primary radiation is converted into secondary radiation. Secondary radiation may be based on conversion by a luminescent material. The secondary radiation may therefore also be indicated as luminescent material radiation. The luminescent material may in embodiments be comprised by the light source, such as a LED with a luminescent material layer or dome comprising luminescent material. In other embodiments, the luminescent material may be configured at some distance ("remote") from the light source, such as a LED with a luminescent material layer not in physical contact with a die of the LED. Hence, in specific embodiments the light source may be a light source that during operation emits at least light at wavelength selected from the range of 380-470 nm. However, other wavelengths may also be possible. This light may partially be used by the luminescent material.

Especially, in embodiments the one or more pump light sources may comprise one or more laser light sources. Even more especially, in embodiments all the pump light sources comprise laser light sources.

The term "laser light source" especially refers to a laser. Such laser may especially be configured to generate laser light source light having one or more wavelengths in the UV, visible, or infrared, especially having a wavelength selected from the spectral wavelength range of 200-2000 nm, such as 300-1500 nm. The term "laser" especially refers to a device that emits light through a process of optical amplification based on the stimulated emission of electromagnetic radiation. Especially, in embodiments the term "laser" may refer to a solid-state laser. In specific embodiments, the terms "laser" or "laser light source", or similar terms, refer to a laser diode (or diode laser). Hence, in embodiments the light source comprises a laser light source. In embodiments, the terms "laser" or "solid state laser" may refer to one or more of cerium doped lithium strontium (or calcium) aluminum fluoride (Ce:LiSAF, Ce:LiCAF), chromium doped chrysoberyl (alexandrite) laser, chromium ZnSe (Cr:ZnSe) laser, divalent samarium doped calcium fluoride ($Sm:CaF_2$) laser, Er:YAG laser, erbium doped and erbium-ytterbium codoped glass lasers, F-Center laser, holmium YAG (Ho:YAG) laser, Nd:YAG laser, NdCrYAG laser, neodymium doped yttrium calcium oxoborate $Nd:YCa_4O(BO_3)_3$ or Nd:YCOB, neodymium doped yttrium orthovanadate ($Nd:YVO_4$) laser, neodymium glass (Nd:glass) laser, neodymium YLF (Nd:YLF) solid-state laser, promethium 147 doped phosphate glass (147 $Pm^{3+}$:glass) solid-state laser, ruby laser ($Al_2O_3$:$Cr^{3+}$), thulium YAG (Tm:YAG) laser, titanium sapphire (Ti:sapphire; $Al_2O_3$:$Ti^{3+}$) laser, trivalent uranium doped calcium fluoride ($U:CaF_2$) solid-state laser, Ytterbium doped glass laser (rod, plate/chip, and fiber), Ytterbium YAG (Yb:YAG) laser, $Yb_2O_3$ (glass or ceramics) laser, etc. In embodiments, the terms "laser" or "solid state laser" may refer to one or more of a semiconductor laser diode, such as GaN, InGaN, AlGaInP, AlGaAs, InGaAsP, lead salt, vertical cavity surface emitting laser (VCSEL), quantum cascade laser, hybrid silicon laser, etc.

A laser may be combined with an upconverter in order to arrive at shorter (laser) wavelengths. For instance, with some (trivalent) rare earth ions upconversion may be obtained or with non-linear crystals upconversion can be obtained. Alternatively, a laser can be combined with a downconverter, such as a dye laser, to arrive at longer (laser) wavelengths.

As can be derived from the below, the term "laser light source" may also refer to a plurality of (different or identical) laser light sources. In specific embodiments, the term "laser light source" may refer to a plurality N of (identical) laser light sources. In embodiments, N=2, or more. In specific embodiments, N may be at least 5, such as especially at least 8. In this way, a higher brightness may be obtained. In embodiments, laser light sources may be arranged in a laser bank (see also above). The laser bank may in embodiments comprise heat sinking and/or optics e.g. a lens to collimate the laser light.

The laser light source is especially configured to generate laser light source light (or "laser light"). The light source light may essentially consist of the laser light source light. The light source light may also comprise laser light source light of two or more (different or identical) laser light sources. For instance, the laser light source light of two or more (different or identical) laser light sources may be coupled into a light guide, to provide a single beam of light comprising the laser light source light of the two or more (different or identical) laser light sources. In specific embodiments, the light source light is thus especially collimated light source light. In yet further embodiments, the light source light is especially (collimated) laser light source light. The phrases "different light sources" or "a plurality of different light sources", and similar phrases, may in embodiments refer to a plurality of solid-state light sources selected from at least two different bins. Likewise, the phrases "identical light sources" or "a plurality of same light sources", and similar phrases, may in embodiments refer to a plurality of solid-state light sources selected from the same bin.

The light source may especially be configured to generate light source light having an optical axis (O), (a beam shape) and a spectral power distribution. The light source light may in embodiments comprise one or more bands, having band widths as known for lasers. In specific embodiments, the band(s) may be relatively sharp line(s), such as having full width half maximum (FWHM) in the range of less than 20 nm at RT, such as equal to or less than 10 nm. Hence, the light source light has a spectral power distribution (intensity on an energy scale as function of the wavelength) which may comprise one or more (narrow) bands.

The beams (of light source light) may be focused or collimated beams of (laser) light source light. The term "focused" may especially refer to converging to a small spot. This small spot may be at the discrete converter region, or (slightly) upstream thereof or (slightly) downstream thereof. Especially, focusing and/or collimation may be such that the cross-sectional shape (perpendicular to the optical axis) of the beam at the discrete converter region (at the side face) is essentially not larger than the cross-section shape (perpendicular to the optical axis) of the discrete converter region (where the light source light irradiates the discrete converter region). Focusing may be executed with one or more optics, like (focusing) lenses. Especially, two lenses may be applied to focus the laser light source light. Collimation may be executed with one or more (other) optics, like collimation elements, such as lenses and/or parabolic mirrors. In embodiments, the beam of (laser) light source light may be relatively highly collimated, such as in embodiments ≤2° (FWHM), more especially ≤1 (FWHM), most especially ≤0.5° (FWHM). Hence, ≤2° (FWHM) may be considered (highly) collimated light source light. Optics may be used to provide (high) collimation (see also above).

The system comprises at least two different luminescent material. The luminescent materials may differ in chemical composition and/or dopant material. Hence, in embodiments the luminescent material may even below to the same class of materials. However, the at least two different luminescent materials have different spectral power distributions upon irradiation with (the same or different) pump light source light. Hence, the at least two different luminescent material provide luminescent material light that have different color points.

In specific embodiments, colors or color points of a first type of light and a second type of light may be different when the respective color points of the first type of light and the second type of light differ with at least 0.01 for u' and/or with at least 0.01 for v', even more especially at least 0.02 for u' and/or with at least 0.02 for v'. In yet more specific embodiments, the respective color points of first type of light and the second type of light may differ with at least 0.03 for u' and/or with at least 0.03 for v'. Here, u' and v' are color coordinate of the light in the CIE 1976 UCS (uniform chromaticity scale) diagram. In the present invention, the respective color points of first type of light and the second type of light may differ with at least 0.05 for u' and/or with at least 0.05 for v', or even at least 0.1 for u' and/or with at least 0.1 for v'. Therefore, in specific embodiments the first luminescent material and the second luminescent material have respective color points that differ with at least 0.1 for u' and/or with at least 0.1 for v'.

Further, in specific embodiments both the first luminescent material and the second luminescent material may be configured to generate luminescent material having a full width half maximum (FWHM) of at least 50 nm, such as at least 60 nm, such as in specific embodiments at least 70 nm. It may also be possible that only one of the first luminescent material and the second luminescent material may be configured to generate luminescent material having a broad band, and the other one may be configured to generate luminescent material having narrower (broad) band. Especially, at least one of the luminescent materials of the (at least) two luminescent material has a FWHM of at least 50 nm, such as at least 60 nm, such as in specific embodiments at least 70 nm. In even more specific embodiments, at least one of the luminescent materials of the (at least) two luminescent material has a FWHM selected from the range of about 90-180 nm, such as selected from the range of 90-160 nm.

Therefore, in embodiments the first luminescent material is configured to convert at least part of the pump light source light into first luminescent material light having a first spectral power distribution. Yet further, in embodiments the second luminescent material is configured to convert at least part of the pump light source light into second luminescent material light having a second spectral power distribution, different from the first spectral power distribution.

The term "luminescent material" especially refers to a material that can convert first radiation, especially one or more of UV radiation and blue radiation, into second radiation. In general, the first radiation and second radiation have different spectral power distributions. Hence, instead of the term "luminescent material", also the terms "luminescent converter" or "converter" may be applied. In general, the second radiation has a spectral power distribution at larger wavelengths than the first radiation, which is the case in the so-called down-conversion. In specific embodiments, however the second radiation has a spectral power distribution with intensity at smaller wavelengths than the first radiation, which is the case in the so-called up-conversion. In embodiments, the "luminescent material" may especially refer to a material that can convert radiation into e.g. visible and/or infrared light. For instance, in embodiments the luminescent material may be able to convert one or more of UV radiation and blue radiation, into visible light. The luminescent material may in specific embodiments also convert radiation into infrared radiation (IR). Hence, upon excitation with radiation, the luminescent material emits radiation. In general, the luminescent material will be a down converter, i.e. radiation of a smaller wavelength is converted into radiation with a larger wavelength ($\lambda_{ex}<\lambda_{em}$), though in specific embodiments the luminescent material may comprise up-converter luminescent material, i.e. radiation of a larger wavelength is converted into radiation with a smaller wavelength ($\lambda_{ex}>\lambda_{em}$). In embodiments, the term "luminescence" may refer to phosphorescence. In embodiments, the term "luminescence" may also refer to fluorescence. Instead of the term "luminescence", also the term "emission" may be applied. Hence, the terms "first radiation" and "second radiation" may refer to excitation radiation and emission (radiation), respectively. Likewise, the term "luminescent material" may in embodiments refer to phosphorescence and/or fluorescence. The term "luminescent material" may also refer to a plurality of different luminescent materials. Examples of possible luminescent materials are indicated below.

In embodiments, luminescent materials are selected from garnets and nitrides, especially doped with trivalent cerium or divalent europium, respectively. The term "nitride" may also refer to oxynitride or nitridosilicate, etc.

In specific embodiments the luminescent material comprises a luminescent material of the type $A_3B_5O_{12}$:Ce, wherein A in embodiments comprises one or more of Y, La, Gd, Tb and Lu, especially (at least) one or more of Y, Gd, Tb and Lu, and wherein B in embodiments comprises one or more of Al, Ga, In and Sc. Especially, A may comprise one or more of Y, Gd and Lu, such as especially one or more of Y and Lu. Especially, B may comprise one or more of Al and Ga, more especially at least Al, such as essentially entirely Al. Hence, especially suitable luminescent materials are cerium comprising garnet materials. Embodiments of garnets especially include $A_3B_5O_{12}$ garnets, wherein A comprises at least yttrium or lutetium and wherein B comprises at least aluminum. Such garnets may be doped with cerium (Ce), with praseodymium (Pr) or a combination of cerium and praseodymium; especially however with Ce. Especially, B comprises aluminum (Al), however, B may also partly comprise gallium (Ga) and/or scandium (Sc) and/or indium (In), especially up to about 20% of Al, more especially up to about 10% of Al (i.e. the B ions essentially consist of 90 or more mole % of Al and 10 or less mole % of one or more of Ga, Sc and In); B may especially comprise up to about 10% gallium. In another variant, B and O may at least partly be replaced by Si and N. The element A may especially be selected from the group consisting of yttrium (Y), gadolinium (Gd), terbium (Tb) and lutetium (Lu). Further, Gd and/or Tb are especially only present up to an amount of about 20% of A. In a specific embodiment, the garnet luminescent material comprises $(Y_{1-x}Lu_x)_3B_5O_{12}$:Ce, wherein x is equal to or larger than 0 and equal to or smaller than 1. The term ":Ce", indicates that part of the metal ions (i.e. in the garnets: part of the "A" ions) in the luminescent material is replaced by Ce. For instance, in the case of $(Y_{1-x}Lu_x)_3Al_5O_{12}$:Ce, part of Y and/or Lu is replaced by Ce. This is known to the person skilled in the art. Ce will replace A in general for not more than 10%; in general, the Ce concentration will be in the range of 0.1 to 4%, especially 0.1 to 2% (relative to A). Assuming 1% Ce and 10% Y, the full correct formula could be $(Y_{0.1}Lu_{0.89}Ce_{0.01})_3Al_5O_{12}$. Ce in garnets is substantially or only in the trivalent state, as is known to the person skilled in the art.

In embodiments, the luminescent material (thus) comprises $A_3BO_{12}$ wherein in specific embodiments at maximum 10% of B—O may be replaced by Si—N.

In specific embodiments the luminescent material comprises $(Y_{x1-x2-x3}A'_{x2}Ce_{x3})_3(Al_{y1-y2}B'_{y2})_5O_{12}$, wherein $x1+x2+x3=1$, wherein $x3>0$, wherein $0<x2+x3\leq 0.2$, wherein $y1+y2=1$, wherein $0\leq y2<0.2$, wherein A' comprises one or more elements selected from the group consisting of lanthanides, and wherein B' comprises one or more elements selected from the group consisting of Ga, In and Sc. In embodiments, x3 is selected from the range of 0.001-0.1. In the present invention, especially $x1>0$, such as >0.2, like at least 0.8. Gamets with Y may provide suitable spectral power distributions.

In specific embodiments at maximum 10% of B—O may be replaced by Si—N. Here, B in B—O refers to one or more of Al, Ga, In and Sc (and O refers to oxygen); in specific embodiments B—O may refer to Al—O. As indicated above, in specific embodiments x3 may be selected from the range of 0.001-0.04. Especially, such luminescent materials may have a suitable spectral distribution (see however below), have a relatively high efficiency, have a relatively high thermal stability, and allow a high CRI (in combination with the first light source light and the second light source light (and the optical filter)). Hence, in specific embodiments A may be selected from the group consisting of Lu and Gd. Alternatively or additionally, B may comprise Ga. Hence, in embodiments the luminescent material comprises $(Y_{x1-x2-x3}(Lu,Gd)_{x2}Ce_{x3})_3(Al_{y1y2}Ga_{y2})_5O_{12}$, wherein Lu and/or Gd may be available. Even more especially, x3 is selected from the range of 0.001-0.1, wherein $0<x2+x3\leq 0.1$, and wherein $0\leq y2\leq 0.1$. Further, in specific embodiments, at maximum 1% of B—O may be replaced by Si—N. Here, the percentage refers to moles (as known in the art); see e.g. also EP3149108. In yet further specific embodiments, the luminescent material comprises $(Y_{x1-x3}Ce_{x3})_3Al_5O_{12}$, wherein $x1+x3=1$, and wherein $0<x3\leq 0.2$, such as 0.001-0.1.

In specific embodiments, the light generating device may only include luminescent materials selected from the type of cerium comprising gamets. In even further specific embodiments, the light generating device includes a single type of luminescent materials, such as $(Y_{x1-x2-x3}A'_{x2}Ce_{x3})_3(Al_{y1y2}B'_{y2})_5O_{12}$. Hence, in specific embodiments the light generating device comprises luminescent material, wherein at least 85 weight %, even more especially at least about 90 wt. %, such as yet even more especially at least about 95 weight % of the luminescent material comprises $(Y_{x1-x2-x3}A'_{x2}Ce_{x3})_3(Al_{y1y2}B'_{y2})_5O_{12}$. Here, wherein A' comprises one or more elements selected from the group consisting of lanthanides, and wherein B' comprises one or more elements selected from the group consisting of Ga In and Sc, wherein $x1+x2+x3=1$, wherein $x3>0$, wherein $0<x2+x3\leq 0.2$, wherein $y1+y2=1$, wherein $0\leq y2\leq 0.2$. Especially, x3 is selected from the range of 0.001-0.1. Note that in embodiments x2=0. Alternatively or additionally, in embodiments y2=0.

In specific embodiments, A may especially comprise at least Y, and B may especially comprise at least Al.

In embodiments, the luminescent material may alternatively or additionally comprise one or more of $M_2Si_5N_8$:$Eu^{2+}$ and/or $MAlSiN_3$:$Eu^{2+}$ and/or $Ca_2AlSi_3O_2N_5$:$Eu^{2+}$, etc., wherein M comprises one or more of Ba, Sr and Ca, especially in embodiments at least Sr. Hence, in embodiments, the luminescent may comprise one or more materials selected from the group consisting of (Ba,Sr,Ca)S:Eu, (Ba,Sr,Ca)$AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba. The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca). Likewise, the material (Ba,Sr,Ca)$AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca). Eu in the above indicated luminescent materials is substantially or only in the divalent state, as is known to the person skilled in the art.

In embodiments, a red luminescent material may comprise one or more materials selected from the group consisting of (Ba,Sr,Ca)S:Eu, (Ba,Sr,Ca)$AlSiN_3$:Eu and $(Ba,Sr,Ca)_2Si_5N_8$:Eu. In these compounds, europium (Eu) is substantially or only divalent, and replaces one or more of the indicated divalent cations. In general, Eu will not be present in amounts larger than 10% of the cation; its presence will especially be in the range of about 0.5 to 10%, more especially in the range of about 0.5 to 5% relative to the cation(s) it replaces. The term ":Eu", indicates that part of the metal ions is replaced by Eu (in these examples by $Eu^{2+}$). For instance, assuming 2% Eu in $CaAlSiN_3$:Eu, the correct formula could be $(Ca_{0.98}Eu_{0.02})AlSiN_3$. Divalent europium will in general replace divalent cations, such as the above divalent alkaline earth cations, especially Ca, Sr or Ba.

The material (Ba,Sr,Ca)S:Eu can also be indicated as MS:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Further, the material $(Ba,Sr,Ca)_2Si_5N_8$:Eu can also be indicated as $M_2Si_5N_8$:Eu, wherein M is one or more elements selected from the group consisting of barium (Ba), strontium (Sr) and calcium (Ca); especially, M comprises in this compound Sr and/or Ba. In a further specific embodiment, M consists of Sr and/or Ba (not taking into account the presence of Eu), especially 50 to 100%, more especially 50 to 90% Ba and 50 to 0%, especially 50 to 10% Sr, such as $Ba_{1.5}Sr_{0.5}Si_5N_8$:Eu (i.e. 75% Ba; 25% Sr). Here, Eu is introduced and replaces at least part of M, i.e. one or more of Ba, Sr, and Ca).

Likewise, the material $(Ba,Sr,Ca)AlSiN_3$:Eu can also be indicated as $MAlSiN_3$:Eu, wherein M is one or more elements selected from the group consisting of barium (Ba), strontium (Sr) and calcium (Ca); especially, M comprises in this compound calcium or strontium, or calcium and strontium, more especially calcium. Here, Eu is introduced and replaces at least part of M (i.e. one or more of Ba, Sr, and Ca).

Eu in the above indicated luminescent materials is substantially or only in the divalent state, as is known to the person skilled in the art.

Blue luminescent materials may comprise YSO ($Y_2SiO_5$:$Ce^{3+}$), or similar compounds, or BAM ($BaMgAl_{10}O_{17}$:$Eu^{2+}$), or similar compounds.

The term "luminescent material" herein especially relates to inorganic luminescent materials. Instead of the term "luminescent material" also the term "phosphor". These terms are known to the person skilled in the art.

Alternatively or additionally, also other luminescent materials may be applied. For instance quantum dots and/or organic dyes may be applied and may optionally be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphide (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Instead of quantum dots or in addition to quantum dots, also other quantum confinement structures may be used. The term "quantum confinement structures" should, in the context of the present application, be understood as e.g. quantum wells, quantum dots, quantum rods, tripods, tetrapods, or nano-wires, etcetera.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Different luminescent materials may have different spectral power distributions of the respective luminescent material light. Alternatively or additionally, such different luminescent materials may especially have different color points (or dominant wavelengths).

As indicated above, other luminescent materials may also be possible. Hence, in specific embodiments the luminescent material is selected from the group of divalent europium containing nitrides, divalent europium containing oxynitrides, divalent europium containing silicates, cerium comprising garnets, and quantum structures. Quantum structures may e.g. comprise quantum dots or quantum rods (or other quantum type particles) (see above). Quantum structures may also comprise quantum wells. Quantum structures may also comprise photonic crystals.

In specific embodiments, the first luminescent material comprises a luminescent material of the type $A_3B_5O_{12}$:Ce, wherein A comprises one or more of Y, La, Gd, Tb and Lu, and wherein B comprises one or more of Al, Ga, In and Sc. Alternatively or additionally, in specific embodiments the second luminescent material comprise one or more of (Ba, Sr,Ca)S:Eu, $(Ba,Sr,Ca)AlSiN_3$:Eu and $(Ba,Sr,Ca)_2Si_5N_8$:Eu. However, other embodiments may also be possible.

The system further comprises optics. The term "optics" may especially refer to optical elements. The optics may include one or more or mirrors, reflectors, collimators, lenses, prisms, diffusers, phase plates, polarizers, diffractive elements, gratings, dichroics, arrays of one or more of the afore-mentioned, etc.

In specific embodiments, the optics may comprise (at least) a first wavelength dependent optics and a second wavelength dependent optics. However, other optics may also be available.

In embodiments, the first wavelength dependent optics may especially be configured downstream of the first luminescent material. Hence, the first wavelength dependent optics may be radiationally coupled with the first luminescent material.

The terms "radiationally coupled" or "optically coupled" may especially mean that (i) a light generating element, such as a light source, and (ii) another item or material, are associated with each other so that at least part of the radiation emitted by the light generating element is received by the item or material. In other words, the item or material is configured in a light-receiving relationship with the light generating element. At least part of the radiation of the light generating element will be received by the item or material. This may in embodiments be directly, such as the item or material in physical contact with the (light emitting surface of the) light generating element. This may in embodiments be via a medium, like air, a gas, or a liquid or solid light guiding material. In embodiments, also one or more optics, like a lens, a reflector, an optical filter, may be configured in the optical path between light generating element and item or material.

The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means is "upstream", and a third position within the beam of light further away from the light generating means is "downstream".

Further, the first wavelength dependent optics may especially be configured to spectrally separate the first luminescent material light into a first part of the first luminescent material light and a second part of the first luminescent material light into two directions.

The phrase "spectrally separate", and similar phrases, especially refer to embodiments wherein an emission band (luminescence band) is separated in at least two wavelength ranges, wherein a first range of wavelengths may substantially be affected in another way than a second range of wavelengths. For instance, the first range of wavelengths may be absorbed, reflected, refracted, or transmitted, and the second range of wavelengths may be absorbed, reflected, refracted, or transmitted, but in a different way. The difference may be in one or more of percentage and angle. For instance, the first range of wavelengths may be reflected in one direction and the second range of wavelengths may be transmitted ((thus) in another direction). For instance, in the visible wavelength range below a first wavelength, essentially all light may be transmitted and above the first wavelength essentially all light may be reflected. However, other embodiments may also be possible. Hence, the first wavelength dependent optics may receive at least part of the first luminescent material light.

Further, as indicated above, a first part of the first luminescent material light and a second part of the first luminescent material light may propagate into two (different) directions. In this way, there is not only a spectral separation, but also an angular separation, like this may e.g. the case with a prism or a dichroic element. Especially, a dichroic element may be used wherein light of a specific wavelength range is transmitted, while light of a different range is reflected (or absorbed).

In embodiments, the two different directions may have a mutual angle larger than 0° up to about 180°, though other values may also be possible. For instance, in embodiments the two different directions may have a mutual angle selected from the range of 30-180°, like selected from the range of 30-150°, such as selected from the range of 35-135°, such as 90°.

Both the first part of the first luminescent material light and a second part of the first luminescent material light may be used in a final beam of (system) light. Hence, via different optical paths, they may be combined; see further also below.

Yet further, the system comprises a second wavelength dependent optics. Especially, the second wavelength dependent optics may be configured downstream of (i) the first wavelength dependent optics and (downstream of) (ii) the second luminescent material. Hence, the second wavelength dependent optics may in embodiments be radiationally coupled with the first wavelength dependent optics and with the second luminescent material.

Therefore, in embodiments the second wavelength dependent optics may receive at least part of the first part of the first luminescent material light or at least part of the second part of the first luminescent material light, as the second wavelength dependent optics is configured downstream of the first wavelength dependent optics. Actually, in embodiments the second wavelength dependent optics may receive at least part of the first part of the first luminescent material light and at least part of the second part of the first luminescent material light, however, via different optical paths; see further also below. Further, the second wavelength dependent optics may receive at least part of the second luminescent material light.

Especially, in embodiments the second wavelength dependent optics may be configured to spectrally combine the first part of the first luminescent material light, the second part of the first luminescent material light, and the second luminescent material light. In embodiments, a dichroic element may be used wherein light of a specific wavelength range is transmitted, while light of a different range is reflected (or absorbed).

For instance, in embodiments least part of the first part of the first luminescent material light propagates to one side of the dichroic filter, and may (at least partly) be transmitted. Further, in embodiments at least part of the second part of the first luminescent material light and at least part of the second luminescent material light propagate to the other side of the dichroic filter, and may (each at least partly) be reflected. In this way, the first part of the first luminescent material light, the second part of the first luminescent material light, and the second luminescent material light, may be combined.

Hence, in embodiments the second wavelength dependent optics may be configured to receive light from two (or more) different directions, which two different directions may have a mutual angle larger than 0° up to about 180°, though other values may also be possible. For instance, in embodiments the two different directions may have a mutual angle selected from the range of 30-180°, like selected from the range of 30-150°, such as selected from the range of 35-135°, such as 90°.

Note that the first wavelength dependent optics and the second wavelength dependent optics may essentially be the same type of optics, though having different functions herein.

Therefore, especially, in embodiments the light generating system may be configured to generate system light comprising one or more of the pump light source light, the first luminescent material light, and the second luminescent material light. Especially, in an operational mode the system light may at least comprising the first luminescent material light and the second luminescent material light. In specific embodiments, in the operational mode the system light may comprise the pump light source light, the first luminescent material light, and the second luminescent material light.

Therefore, in embodiments the pump light source light may have a centroid wavelength $\lambda_{c,p}$, the first part of the first luminescent material light may have a centroid wavelength $\lambda_{c,11}$, the second part of the first luminescent material light may have a centroid wavelength $\lambda_{c,12}$, and the second luminescent material light may have a centroid wavelength $\lambda_{c,2}$, wherein in specific embodiments $\lambda_{c,p} \leq \lambda_{c,11} < \lambda_{c,12}$. Further, in specific embodiments $\lambda_{c,12} \leq \lambda_{c,2}$. In general, in embodiments the following may apply: $\lambda_{c,p} \leq \lambda_{c,11} < \lambda_{c,12}$. The (respective) differences may be each at least 10 nm, such as each at least 20 nm. Further, in specific embodiments, $\lambda_{c,12} < \lambda_{c,2}$, though this is not necessarily the case.

The term "centroid wavelength", also indicated as $\lambda_c$, is known in the art, and may refer to the wavelength value where half of the light energy is at shorter and half the energy is at longer wavelengths; the value is stated in nanometers (nm). It is the wavelength that divides the integral of a spectral power distribution into two equal parts as expressed by the formula $\lambda c = \Sigma k^* I(\lambda)/(\Sigma I(\lambda)$, where the summation is over the wavelength range of interest, and $I(\lambda)$ is the spectral energy density (i.e. the integration of the product of the wavelength and the intensity over the emission band normalized to the integrated intensity). The centroid wavelength may e.g. be determined at operation conditions.

Especially, the spectral power distribution of the first luminescent material light and the spectral power distribution of the second luminescent material light may overlap. When depicted in an energy scale in a graph, especially Watt on the y-axis, and normalized (to e.g. 1), the overlap may be selected from the range of 5-70%, such as 5-60%, like 10-50%, wherein the overlap describes the overlap of the smaller peak with the larger peak (i.e. overlap of the emission band with smaller area in the graph with the emission band having a larger area), i.e. the overlapping area divided by the area of the larger emission band.

Hence, in embodiments a spectral power distribution (Watt versus k) of one of the first luminescent material light and the second luminescent material light overlaps with 5-70%, such as 5-50%, of a spectral power distribution (Watt versus k) of the other. As indicated above, the spectral power distributions are especially normalized. Further, as indicated above, especially the overlap of a smaller sized emission band of the smaller sized emission band may be chosen. Note that the term “emission band” may also refer to a plurality of emission bands. Hence, in embodiments the spectral power distribution of one of the first luminescent material light and the second luminescent material light overlaps with 5-50% of the spectral power distribution of the other. Or, in other words, 5-50% of the first spectral power distribution overlaps with the second spectral power distribution, or, 5-50% of the second spectral power distribution overlaps with the first spectral power distribution. Especially, in embodiments the overlap is at least 10%, such as about 15-50%.

In yet further specific embodiments, the luminescent material having a larger dominant wavelength may overlap for about 5-50% with the luminescent material having a smaller dominant wavelength. Further, at least both may have a full width half maximum of at least 50 nm (see also above).

As indicated above, one or more of the first wavelength dependent optics and the second wavelength dependent optics may comprise a dichroic element. Especially, both may comprise a dichroic element. In yet further specific embodiments, the first wavelength dependent optics and the second wavelength dependent optics may comprise essentially the same type of dichroic element, as the first dichroic element may be configured to spectrally separate the first luminescent material light into the first part of the first luminescent material light and the second part of the first luminescent material light into two directions, and the second dichroic element may be configured to combine the first part of the first luminescent material light and the second part of the first luminescent material light, which may be received by the second dichroic element from different two directions.

In yet further specific embodiments, the first wavelength dependent optics and the second wavelength dependent optics may be arranged under the same angle with respect to the pump light source light that is received by the first wavelength dependent optics and the second wavelength dependent optics, respectively.

As known in the art, a dichroic filter is especially a type of filter that may be used to transmit or reflect light, depending on the wavelength; light of a specific wavelength range may be transmitted, while light of a different wavelength range may be reflected (or absorbed).

As can be derived from the above, in specific embodiments the first wavelength dependent optics is transmissive for the first part of the first luminescent material light and reflective for the second part of the first luminescent material light. In specific embodiments, however, the first wavelength dependent optics may be reflective for the first part of the first luminescent material light and may be transmissive for the second part of the first luminescent material light. However, other embodiments may also be possible.

Alternatively or additionally, in embodiments the second wavelength dependent optics is transmissive for the first part of the first luminescent material light and reflective for the second part of the first luminescent material light and reflective for second luminescent material light. In specific embodiments, however, the second wavelength dependent optics may be reflective for the first part of the first luminescent material light and transmissive for the second part of the first luminescent material light and reflective for second luminescent material light. However, other embodiments may also be possible.

As indicated above, in embodiments the second wavelength dependent optics may be configured to combine the first part of the first luminescent material light, the second part of the first luminescent material light, and the second luminescent material light. As the first part of the first luminescent material light, the second part of the first luminescent material light, have different spectral distributions, induced by the first wavelength dependent optics, they may propagate from different directions to the second wavelength dependent optics. In yet further specific embodiments, they may irradiate different sides of the second wavelength dependent optics. However, the second part of the first luminescent material light and the second luminescent material light may propagate from essentially the same direction, or may even propagate at least part of an optical path colinear.

Therefore, in specific embodiments the first luminescent material, the second luminescent material, and the optics are configured such that during operation of the light generating system over at least a part of a pathlength between the second luminescent material and the second optics, the second part of the first luminescent material light and second luminescent material light propagate colinear.

For instance, this may be achieved when the second part of the first luminescent material light and the second luminescent material are configured in one or more of the reflective mode and the transmissive mode. In the former embodiment, the second luminescent material may especially be at least partially reflective for the second part of the first luminescent material light, such as reflecting more than 20%, like more than 30%, such as at least 50%, of the second part of the first luminescent material light, or even at least 70%. In the latter embodiment, the second luminescent material may especially be at least partially transmissive for the second part of the first luminescent material light, such as transmitting more than 20%, like more than 30%, such as at least 50%, of the second part of the first luminescent material light, or even at least 70%. In such embodiments, downstream of the second luminescent material, the second part of the first luminescent material light and second luminescent material light may propagate collinearly away from the second luminescent material.

Therefore, in embodiments the second luminescent material may be configured in a transmissive mode in relation to one or more of the one or more pump light sources. Alternatively (or additionally), the second luminescent material may be configured in a reflective mode in relation to one or more of the one or more pump light sources. Other embodiments, however, may also be possible.

When the second luminescent material is irradiated with pump light source light and the second part of the first luminescent material light, especially in a reflective mode, it may be desirable to control the direction of reflection of the second part of the first luminescent material light and of the unabsorbed but reflected pump light source light. For instance, it may be desirable that the second part of the first luminescent material light propagates essentially in the same direction as the second luminescent material light propagates, whereas remaining pump light (after reflection at the second luminescent material) may not propagate in the same direction (and may substantially not end up in the system light). Hence, in specific embodiments the light generating system (further) comprises an arrangement comprising the second luminescent material and a fifth optics, wherein the arrangement comprises an arrangement face and a virtual axis perpendicular to the arrangement face, wherein the light generating system is configured to provide the second part of the first luminescent material light to the arrangement under a first angle ($\alpha 1$) relative to the virtual axis, and wherein the fifth optics is configured to reflect the first luminescent material light under an second angle ($\alpha 2$) relative to the virtual axis, wherein $\alpha 1 \neq \alpha 2$. For instance, in embodiments $5° \leq |\alpha 1 - \alpha 2| \leq 80°$.

Note, however, that it may in embodiments be desirable that pump light is available in the system light. Such pump light source light may e.g. propagate along with the first part of the first luminescent material light and/or may be provided while bypassing the first luminescent material and the second luminescent material (see also above and below).

The first luminescent material (and one or more of the one or more pump light sources) may be configured in a reflective mode or in a transmissive mode. With a transmissive mode, it may be possible to easily tune transmission of the pump light source light, including essentially full conversion. Further, with a transmissive mode less dichroics may be necessary. A reflective mode may provide a higher efficiency and/or may allow a better thermal management.

Hence, in embodiments the first luminescent material may be configured in a reflective mode in relation to one or more of the one or more pump light sources, wherein the optics comprise a third wavelength dependent optics. Especially, the third wavelength dependent optics may be (a) configured downstream of (i) the first luminescent material and (downstream of) (ii) the one or more of the one or more pump light sources, and (b) configured upstream of the first wavelength dependent optics. In embodiments, the third wavelength dependent optics may be configured to reflect the pump light source light of the one or more of the one or more pump light sources and configured to transmit the first luminescent material light. Hence, especially in embodiments the first luminescent material is configured in a reflective mode in relation to one or more of the one or more pump light sources, wherein the optics comprise a third wavelength dependent optics, wherein the third wavelength dependent optics is (a) configured downstream of (i) the first luminescent material and (downstream of) (ii) the one or more of the one or more pump light sources, and (b) configured upstream of the first wavelength dependent optics, wherein the third wavelength dependent optics is configured to reflect the pump light source light of the one or more of the one or more pump light sources and configured to transmit the first luminescent material light. Hereby, a reflective mode embodiment is provided. Especially, the third optics may (also) comprise a dichroic element.

However, as indicated above, also a transmissive mode may be possible. Therefore, in yet (other) embodiments the first luminescent material may be configured in a transmissive mode in relation to one or more of the one or more pump light sources, wherein the optics comprise a fourth wavelength dependent optics, wherein the fourth wavelength dependent optics are configured (a) downstream of the one or more of the one or more pump light sources, and (b) upstream of the first luminescent material. Especially, the fourth wavelength dependent optics may be configured to (i) transmit the pump light source light of the one or more of the one or more pump light sources and (ii) to reflect the first luminescent material light. Therefore, in specific embodiments the first luminescent material may be configured in a transmissive mode in relation to one or more of the one or more pump light sources, wherein the optics comprise a fourth wavelength dependent optics configured downstream of the one or more of the one or more pump light sources, and configured upstream of the first luminescent material, wherein the fourth wavelength dependent optics is configured to transmit the pump light source light of the one or more of the one or more pump light sources and configured to reflect the first luminescent material light. Especially, the fourth optics may (also) comprise a dichroic element.

The first luminescent material and the one or more pump light source may be configured such that along with the first luminescent material light, essentially no pump light source propagates. This may be achieved in several ways.

For instance, the first luminescent material may be configured to absorb essentially all pump light source light it receives and/or reflect unabsorbed pump light source light back. This may e.g. be achievable when using the transmissive configuration (wherein thus the first luminescent material is effectively essentially not transmissive for the pump light source it receives). This may e.g. also be achieved when using an optical filter downstream of the first luminescent material, which optical filter is configured to (i) allow passing (by reflection or transmission) the first luminescent material light (ii) essentially not to allow passing (in the same direction) (by reflection or transmission) of the pump light source light.

However, the first luminescent material and the one or more pump light source may also be configured such that along with the first luminescent material light, part of the pump light source propagates (along) with the first luminescent material light. This may especially be useful when the pump light source light that is used to pump the first luminescent material, may also have a useful contribution to the system light, such as in the case of blue pump light source light. In such embodiments blue light may propagate together with the first part of the first luminescent material light or the second part of the first luminescent material light. As herein in general the first part relates to a spectral part having shorter wavelengths than the second part, especially part of the pump light may propagate together with the first part of the first luminescent material light over at least a part of an optical path of the first part of the first luminescent material light. In such embodiments, the second wavelength dependent optics may receive part of the pump light. Alternatively or addition, part of the pump light may bypass the first luminescent material (and second luminescent material) and may be provided to the second wavelength optics as such, e.g. for admixing with the other light contributions, to end up in the system light.

Hence, further in relation to the second wavelength dependent optics it may also be possible that the optics may be configured to transmit or reflect part of the pump light (for instance because it propagates together with the first part of the first luminescent material light or it is provided as such). Therefore, in specific embodiments the second wavelength dependent optics may (thus also) be configured downstream of the one or more of the one or more pump light sources, wherein the second wavelength dependent optics is transmissive for the pump light source light of the one or more of the one or more pump light sources.

As indicated above, in embodiments the pump light source light may comprise blue light. Further, in specific embodiments the first luminescent material may be configured to generate first luminescent material light comprising one or more of green light and yellow light. Yet further, in specific embodiments the second luminescent material may be configured to generate second luminescent material light comprising red light. Therefore, in specific embodiments (i) the pump light source light may comprise one or more pump light wavelengths in the blue spectral region, (ii) the first luminescent material light may comprise one or more first luminescent material light wavelengths in one or more of the green and yellow spectral regions, and (iii) the second luminescent material light may comprise one or more second luminescent material light wavelengths in the red spectral region. In yet further specific embodiments, the system light is white light comprising pump light source light, first luminescent material light, and second luminescent material light. Therefore, in specific embodiments, in an operational mode of the system, the system light may be white light.

The term "white light" herein, is known to the person skilled in the art. It especially relates to light having a correlated color temperature (CCT) between about 1800 K and 20000 K, such as between 2000 and 20000 K, especially 2700-20000 K, for general lighting especially in the range of about 2700 K and 6500 K. In embodiments, for backlighting purposes the correlated color temperature (CCT) may especially be in the range of about 7000 K and 20000 K. Yet further, in embodiments the correlated color temperature (CCT) is especially within about 15 SDCM (standard deviation of color matching) from the BBL (black body locus), especially within about 10 SDCM from the BBL, even more especially within about 5 SDCM from the BBL. The terms "visible", "visible light" or "visible emission" and similar terms refer to light having one or more wavelengths in the range of about 380-780 nm. Herein, UV may especially refer to a wavelength selected from the range of 200-380 nm. The terms "light" and "radiation" are herein interchangeably used, unless clear from the context that the term "light" only refers to visible light. The terms "light" and "radiation" may thus refer to UV radiation, visible light, and IR radiation. In specific embodiments, especially for lighting applications, the terms "light" and "radiation" refer to (at least) visible light. The terms "violet light" or "violet emission" especially relates to light having a wavelength in the range of about 380-440 nm. The terms "blue light" or "blue emission" especially relates to light having a wavelength in the range of about 440-495 nm (including some violet and cyan hues). The terms "green light" or "green emission" especially relate to light having a wavelength in the range of about 495-570 nm. The terms "yellow light" or "yellow emission" especially relate to light having a wavelength in the range of about 570-590 nm. The terms "orange light" or "orange emission" especially relate to light having a wavelength in the range of about 590-620 nm. The terms "red light" or "red emission" especially relate to light having a wavelength in the range of about 620-780 nm. The term "pink light" or "pink emission" refers to light having a blue and a red component. The term "cyan" may refer to one or more wavelengths selected from the range of about 490-520 nm. The term "amber" may refer to one or more wavelengths selected from the range of about 585-605 nm, such as about 590-600 nm.

The system may further comprise a control system, especially configured to control the one or more pump light sources. Especially, when part of the pump light source light follows another optical path than another part of the pump light source light, it may be useful to control the different contributions.

For instance, this may be the case in embodiments wherein there are two or more pump light sources.

Alternatively or additionally, for instance this may be the case in embodiments wherein the pump light source light is splitted into two or more directions, each following different optical paths.

For instance, this may also be the case in embodiments wherein different pump light sources are configured to irradiate the first luminescent material and the second luminescent material. In the latter embodiment, the pump light sources may even be configured to generate pump light source light having different peak wavelengths or different centroid wavelengths. This may e.g. be useful when the different luminescent material have different excitation maxima, like e.g. at 430 nm and at 460 nm (by way of example).

Hence, in embodiments the system may further comprise a control system, especially configured to control the one or more pump light sources. Would the optics comprise controllable optics, like optics which an angle of reflection may be controlled, or optics of which absorption and/or reflection and/or refraction is controllable, also such optics may be controlled. The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions form a remote control. In embodiments, the control system may be controlled via an App on a device, such as a portable device, like a Smartphone or I-phone, a tablet, etc. The device is thus not necessarily coupled to the lighting system, but may be (temporarily) functionally coupled to the lighting system. Hence, in embodiments the control system may (also) be configured to be controlled by an App on a remote device. In such embodiments the control system of the lighting system may be a slave control system or control in a slave mode. For instance, the lighting system may be identifiable with a code, especially a unique code for the respective lighting system. The control system of the lighting system may be configured to be controlled by an external control system which has access to the lighting system on the basis of knowledge (input by a user interface of with an optical sensor (e.g. QR code reader) of the (unique) code. The lighting system may also comprise means for communicating with other systems or devices, such as on the basis of Bluetooth, WIFI, LiFi, ZigBee, BLE or WiMAX, or another wireless technology. The system, or apparatus, or device may execute an action in a “mode” or “operation mode” or “mode of operation”. Likewise, in a method an action or stage, or step may be executed in a “mode” or “operation mode” or “mode of operation” or “operational mode”. The term “mode” may also be indicated as “controlling mode”. This does not exclude that the system, or apparatus, or device may also be adapted for providing another controlling mode, or a plurality of other controlling modes. Likewise, this may not exclude that before executing the mode and/or after executing the mode one or more other modes may be executed. However, in embodiments a control system may be available, that is adapted to provide at least the controlling mode. Would other modes be available, the choice of such modes may especially be executed via a user interface, though other options, like executing a mode in dependence of a sensor signal or a (time) scheme, may also be possible. The operation mode may in embodiments also refer to a system, or apparatus, or device, that can only operate in a single operation mode (i.e. “on”, without further tunability).

Hence, in embodiments, the control system may control in dependence of one or more of an input signal of a user interface, a sensor signal (of a sensor), and a timer. The term “timer” may refer to a clock and/or a predetermined time scheme.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems. In yet a further aspect, the invention also provides a lamp or a luminaire comprising the light generating system as defined herein. The luminaire may further comprise a housing, optical elements, louvres, etc. etc. . . . . The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or “projector” or “image projector” may be an optical device that projects an image (or moving images) onto a surface, such as e.g. a projection screen. The projection device may include one or more light generating systems such as described herein. Hence, in an aspect the invention further provides a light generating device selected from the group of a lamp, a luminaire, a projector device, a disinfection device, and an optical wireless communication device, comprising the light generating system as defined herein. Therefore, amongst others the invention provides to a light generating system as well as to a light generating device comprising such light generating system, which may e.g. used for or comprised in projection lighting, stage-lighting, spot-lighting or automotive lighting.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
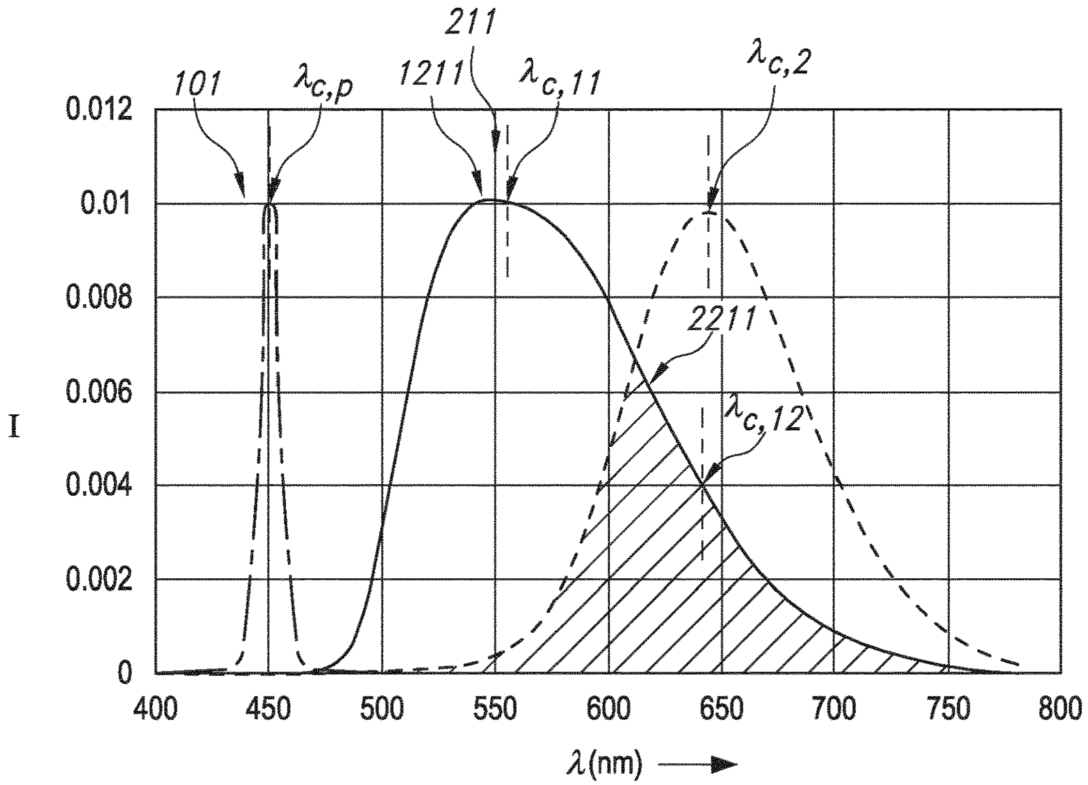
FIG. 1 shows to emission bands which are essentially normalized to 0.01, in a power (Watt)-k diagram.

When two overlapping beams are combined using a dichroic filter, at least part of the overlapping light may be lost. Referring to FIG. 1, assuming e.g. a theoretical dichroic filter that reflects all radiation below 600 nm and transmits all radiation above 600 nm, then the part of the emission band that is not reflected or transmitted, reflectively, may be lost. This is less desirable. Hence, herein solutions are proposed to solve this problem at least partially. Amongst others, in embodiments various configurations for combining light from e.g. a garnet and red emitter with an overlap in the red region with increased efficiency are described. In FIG. 1, the y-axis may be an energy-based scale, especially in Watts. The x-axis may be a nanometer scale. Assuming normalized emission bands, the left emission band (e.g. garnet luminescent material with $Ce^{3+}$) appears to have a larger area than the right emission band (e.g. nitride luminescent material with $Eu^{2+}$). The overlap of the latter with the former may be about 25-40% of the (area of the) left emission band. Hence, FIG. 1 depicts two emission bands.

In embodiments, a first (e.g. UV and/or blue) laser light source may provide first laser light which is directed onto a first luminescent element (e.g. phosphor e.g. garnet phosphor) in the reflective mode. The first luminescent element is arranged on/in a first heat sink and is converting first laser light into first converted light. A first dichroic element is used to prevent that the first converted light is redirected to the first laser light source. The first dichroic element which is arranged between the first laser light source and the first luminescent element. The first dichroic element is transparent for first laser light and (specular) reflective for first converted light or the first dichroic element is (specular) reflective for first laser light and transparent for first converted light. At least part of the first converted light is directed (e.g. focused by optics e.g. a lens) through a pinhole onto a second luminescent element (e.g. phosphor e.g. garnet phosphor) in the transmissive mode. A second (e.g. UV and/or blue) laser light source is providing second laser light which directed (e.g. focused by optics e.g. a lens) through the pinhole onto the second luminescent element. The second luminescent element is converting the second laser light into second converted light. The first converted light and the second converted light have overlapping spectra and are both exiting a second light exit surface of second luminescent element.

Figure 2A:
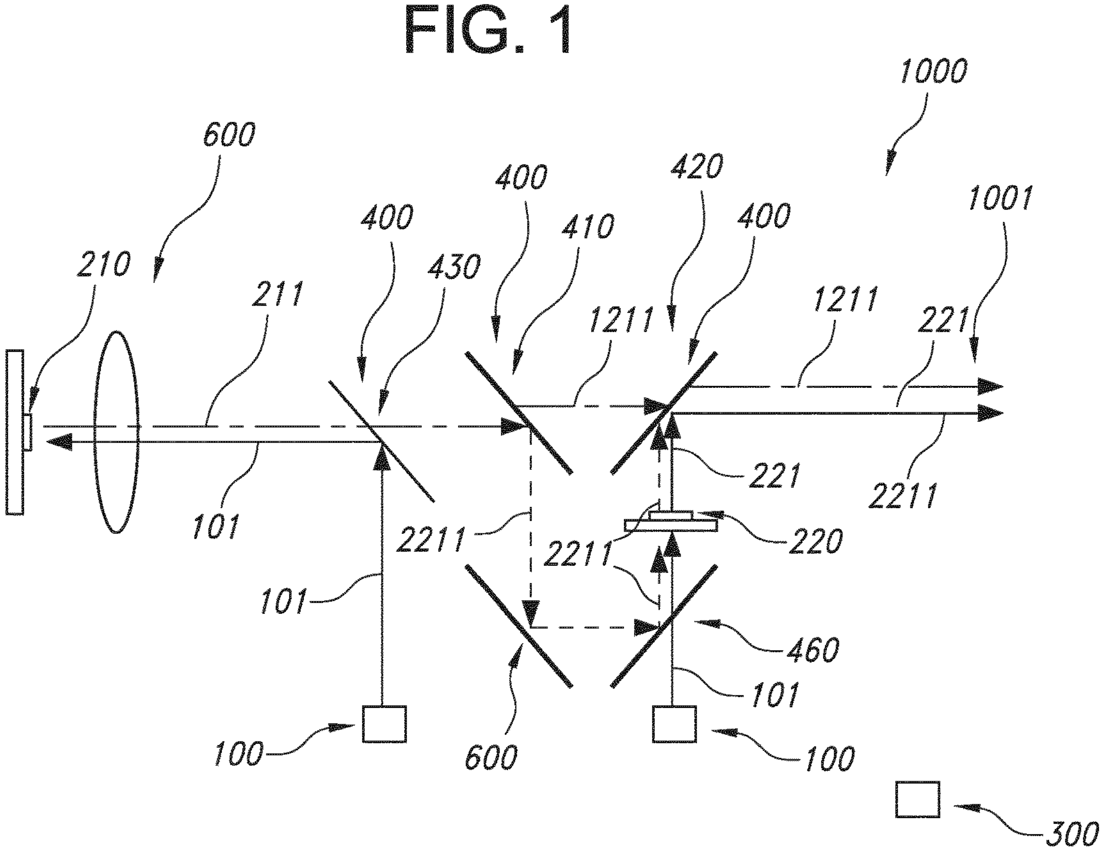
FIGS. 2a-2c schematically depict some embodiments of the system.

Referring to FIG. 2*a*, an embodiment of a light generating system 1000 is schematically depicted. The light generating system 1000 comprises one or more pump light sources 100, a first luminescent material 210, a second luminescent material 220, and optics 400.

Especially, the one or more pump light sources 100 are configured to generate pump light source light 101.

Further, in embodiments the first luminescent material 210 may be configured to convert at least part of the pump light source light 101 into first luminescent material light 211 having a first spectral power distribution. Especially, in embodiments the second luminescent material 220 may be configured to convert at least part of the pump light source light 101 into second luminescent material light 221 having a second spectral power distribution, different from the first spectral power distribution.

Yet further, in embodiments the optics 400 comprise a first wavelength dependent optics 410 and a second wavelength dependent optics 420. As schematically depicted, more optics than the first wavelength dependent optics 410 and the second wavelength dependent optics 420 may be comprised by the system. Also further optics may be available, which are not depicted, like focusing optics, collimating optics, optical filters, etc. etc. Reference 600 refers to further optics, like lenses and reflectors, e.g. to focus or reflect light, respectively.

In embodiments, the first wavelength dependent optics 410 may be configured downstream of the first luminescent material 210. The first wavelength dependent optics 410 may be configured to spectrally separate the first luminescent material light 211 into a first part 1211 of the first luminescent material light 211 and a second part 2211 of the first luminescent material light 211 into two directions.

Yet further, in embodiments the second wavelength dependent optics 420 may be configured downstream of (i) the first wavelength dependent optics 410 and (ii) the second luminescent material 220. Especially, the second wavelength dependent optics 420 may be configured to spectrally combine the first part 1211 of the first luminescent material light 211, the second part 2211 of the first luminescent material light 211, and the second luminescent material light 221.

In specific embodiments, the light generating system 1000 is configured to generate system light 1001 comprising one or more of the pump light source light 101, the first luminescent material light 211, and the second luminescent material light 221.

In embodiments, one or more of the first wavelength dependent optics 410 and the second wavelength dependent optics 420 comprise a dichroic element.

Especially, in embodiments the first wavelength dependent optics 410 may be transmissive for the first part 1211 of the first luminescent material light 211 and may be reflective for the second part 2211 of the first luminescent material light 211.

In embodiments, the second wavelength dependent optics 420 may be transmissive for the first part 1211 of the first luminescent material light 211 and reflective for the second part 2211 of the first luminescent material light 211 and reflective for second luminescent material light 221.

Yet further, in embodiments the first luminescent material 210, the second luminescent material 220, and the optics 400 may be configured such that during operation of the light generating system 1000 over at least a part of a pathlength between the second luminescent material 220 and the second optics 420, the second part 2211 of the first luminescent material light 211 and second luminescent material light 221 propagate colinear.

As schematically depicted in FIG. 2*a*, the first luminescent material 210 may be configured in a reflective mode in relation to one or more of the one or more pump light sources 100. In embodiments, the optics 400 may comprise a third wavelength dependent optics 430 configured downstream of (i) the first luminescent material 210 and (ii) the one or more of the one or more pump light sources 100. Yet further, the third wavelength dependent optics 430 may be configured upstream of the first wavelength dependent optics 410. Especially, the third wavelength dependent optics 430 may be configured to reflect the pump light source light 101 of the one or more of the one or more pump light sources 100 and configured to transmit the first luminescent material light 211.

In specific embodiments, the third optics 430 may comprise a dichroic element.

Pump light source 101 may thus be used to pump the second luminescent material 220. In FIG. 2*a*, this is done in the transmissive mode. Hence, in embodiments the second part 2211 of the first luminescent material light 211 may colinear and part of the pump light source light 101 may propagate colinear. The system may further comprise sixth optics 460, which may be configured to reflect or transmit the second part 2211 of the first luminescent material light 211, and which may be configured to transmit or reflect part of the pump light source light 101. This sixth optics 460 may thus in embodiments be configured upstream of the second luminescent material and downstream of the first luminescent material 210 and one or more of the one or more pump light sources 100.

As schematically depicted, in embodiments the second luminescent material 220 may be configured in a transmissive mode in relation to one or more of the one or more pump light sources 100.

In specific embodiments, the pump light source light 101 may comprise one or more pump light wavelengths in the blue spectral region; the first luminescent material light 211 may comprise one or more first luminescent material light wavelengths in one or more of the green and yellow spectral regions; the second luminescent material light 221 comprises one or more second luminescent material light wavelengths in the red spectral region. Especially, in embodiments in an operational mode the system light 1001 may be white light comprising pump light source light 101, first luminescent material light 211, and second luminescent material light 221.

In specific embodiments, the first luminescent material 210 comprises a luminescent material of the type $A_3B_5O_{12}$:Ce, wherein A comprises one or more of Y, La, Gd, Tb and Lu, and wherein B comprises one or more of Al, Ga, In and Sc. The second luminescent material 220 may e.g. comprise a red emitting nitride or oxide nitride, or a red emitting sulfide or thiogallate. Such materials may e.g. be based on divalent europium, as known in the art (see also above).

In specific embodiments, the one or more pump light sources 100 comprise one or more laser light sources.

Further, in specific embodiments the first luminescent material 210 and the second luminescent material 220 have respective color points that differ with at least 0.1 for u' and/or with at least 0.1 for v'.

Reference 300 indicates a controlling system, especially configured to control the pump light source(s) 100.

Figure 2B:
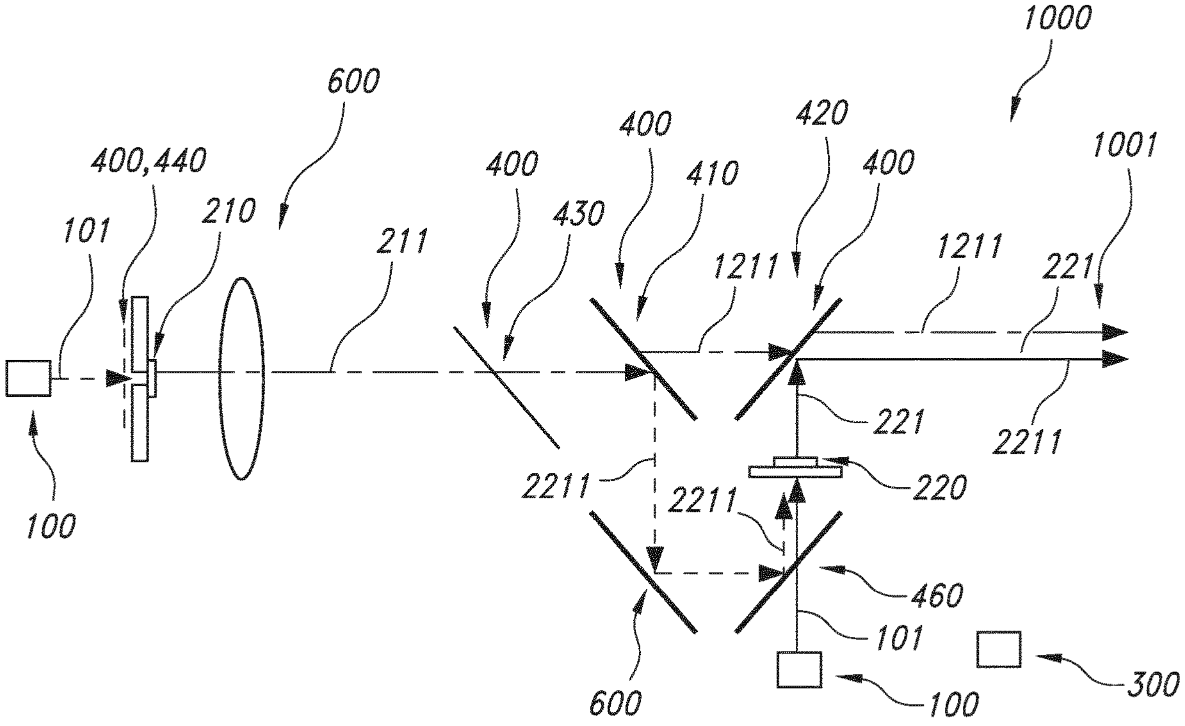

In embodiments, the first laser light source may also be used in the transmissive mode (see FIG. 2*b*). In this case a first dichroic element may be arranged between the first laser light source and the first luminescent element. In this case, the first dichroic element is transparent for first laser light and reflective for first converted light.

Referring to FIG. 2*b*, in embodiments the first luminescent material 210 may be configured in a transmissive mode in relation to one or more of the one or more pump light sources 100. Especially, in such embodiments the optics 400 may comprise a fourth wavelength dependent optics 440 configured downstream of the one or more of the one or more pump light sources 100, and configured upstream of the first luminescent material 210. Especially, in embodiments the fourth wavelength dependent optics 440 may be configured to transmit the pump light source light 101 of the one or more of the one or more pump light sources 100 and configured to reflect the first luminescent material light 211.

The fourth wavelength dependent optics 440 may (also) comprise a dichroic element. Hence, in specific embodiments, the third optics 430 or the fourth optics 440, or both, may comprise a dichroic element.

Figure 2C:
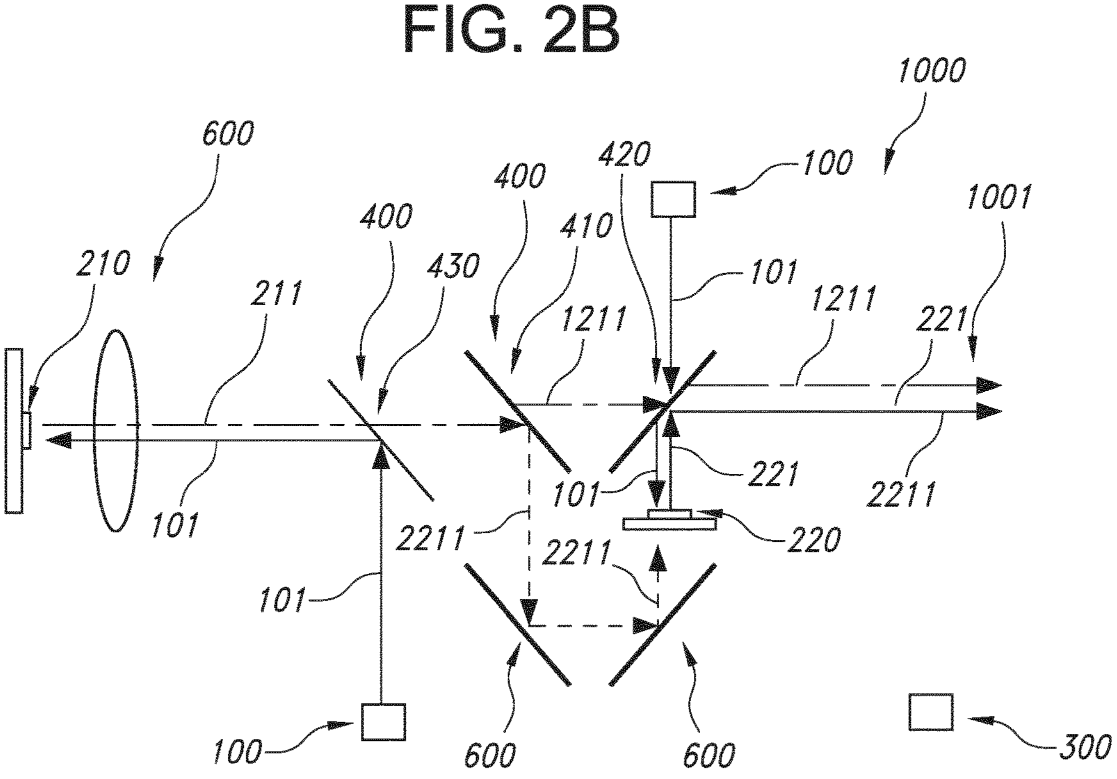

In embodiments, the second laser light source may also be used in the reflective mode (see FIG. 2*c*). In this case a (further) dichroic element may be used. The (further) dichroic element may especially be transparent for the second laser light and reflective for second part of the first luminescent material light and the second luminescent material light. Alternatively, the further dichroic element may be (specular) reflective for the second laser light and may be transparent for the second part of the first luminescent material light and the second luminescent material light.

Hence, referring to FIG. 2*c*, in embodiments the second luminescent material 220 may be configured in a reflective mode in relation to one or more of the one or more pump light sources 100.

In specific embodiments, as schematically depicted in FIG. 2*c* for an embodiment, the second wavelength dependent optics 420 may (also) be configured downstream of the one or more of the one or more pump light sources 100. In further specific embodiments, the second wavelength dependent optics 420 may be transmissive for the pump light source light 101 of the one or more of the one or more pump light sources 100.

In yet further embodiments, one may use a first laser for providing first laser light and a first luminescent element for converting first laser light into first converted light. The first converted light and second laser light provided by a second laser are focused onto a second luminescent element. The second luminescent element converts second laser light into second converted light emitted in a first direction. The first converted light is reflected by the second luminescent element in a second direction wherein the angle of incidence is different from the angle of reflection. The first direction and second direction are substantially the same.

Figure 3A:
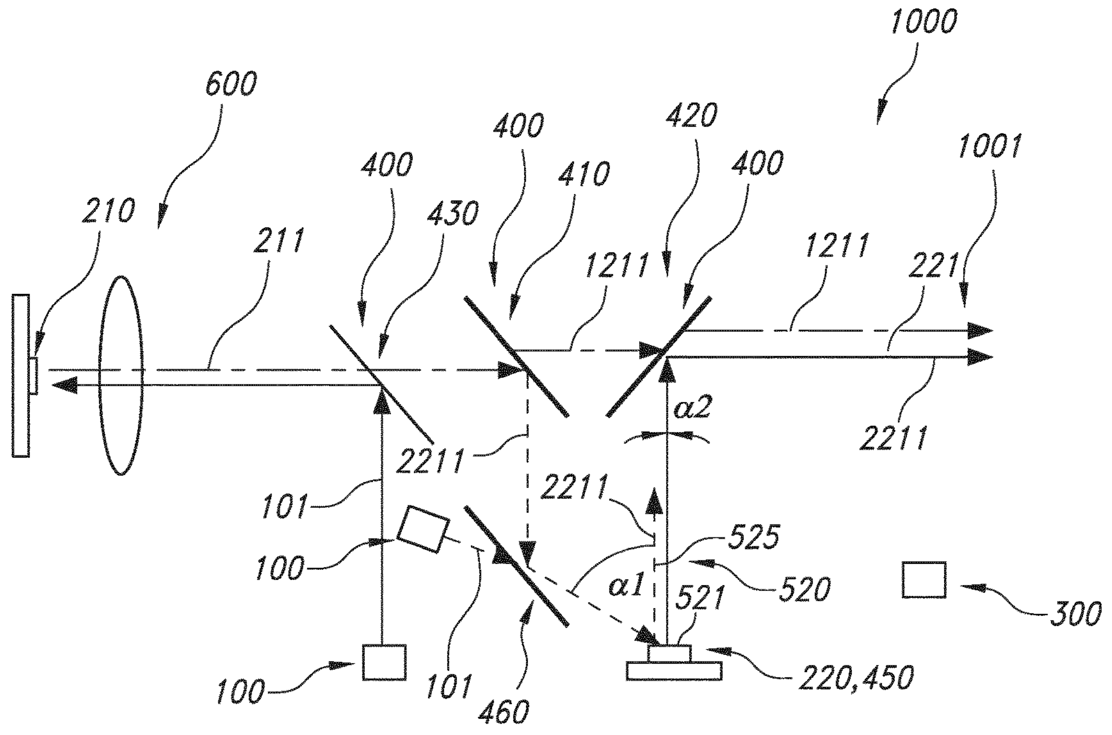
FIGS. 3a-3b schematically depict an embodiments of the system and some aspects.

Referring to FIG. 3*a*, in embodiments the light generating system 1000 may comprise an arrangement 520 comprising the second luminescent material 220 and a fifth optics 450. The arrangement 520 may comprise an arrangement face 521 and a virtual axis 525 perpendicular to the arrangement face. Especially, the light generating system 1000 may be configured to provide the second part 2211 of the first luminescent material light 211 to the arrangement 520 under a first angle $\alpha 1$ relative to the virtual axis 525. Further, especially the fifth optics 450 may be configured to reflect the first luminescent material light 211 under an second angle $\alpha 2$ relative to the virtual axis 525, wherein $\alpha 1 \neq \alpha 2$. For instance, in embodiments $5° \leq |\alpha 1 - \alpha 2| \leq 80°$. For instance, in specific embodiments $15° \leq |\alpha 1 - \alpha 2| \leq 70°$.

Figure 3B:
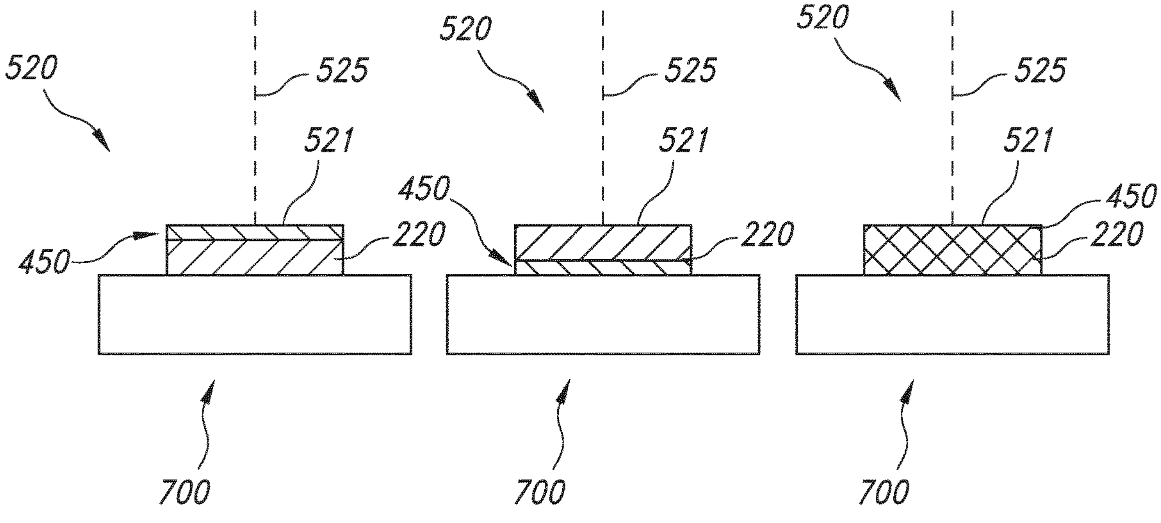

Referring to FIG. 3*b*, the arrangement 520 may comprise a (refractive/diffractive/reflective/diffuse) layer which may be configured to redirect the first converted light wherein the angle of incidence is different from the angle of reflection. For example, a light scattering layer may be applied on top of, in or below a layer of the second luminescent material 220.

In embodiments, a diffusive optics may comprise a (thin) scattering layer e.g. $Al_2O_3$, $BaSO_4$ and/or $TiO_2$, for instance in a polymer or ceramic matrix, e.g. silicone. In embodiments, a refractive optics may comprise a transmissive layer with a surface having roughness, e.g. a ceramic material, or e.g. glass with a roughened surface. A diffractive optics may e.g. comprise a photonic crystal. A diffractive optics may e.g. comprise a grating made with a transparent material, such a based on sol-gel materials.

Referring to FIGS. 2*a*-3*a*, the gain by using above described configurations may be at least 3%, such as even at least at least 5%, like at least 10%, such as up to about 20%. Calculates provide an increase in embodiments of about 13%. However, smaller gains than 13%, even smaller gains than 3%, may still be relevant, for instance for projection applications.

Referring to FIGS. 2*a*-3*a*, more light sources may be available than depicted. The light of such light sources may be admixed in the final beam of light, e.g. downstream of the second wavelength dependent optics 420.

In embodiments, the first luminescent material 210 is in physical contact with a heat sink or heat spreader, especially a heat sink. Alternatively or additionally, the second luminescent material 220 is in physical contact with a heat sink or heat spreader, especially a heat sink. Reference 700 in FIG. 3*b* refers to a heat sink.

Figure 4A:
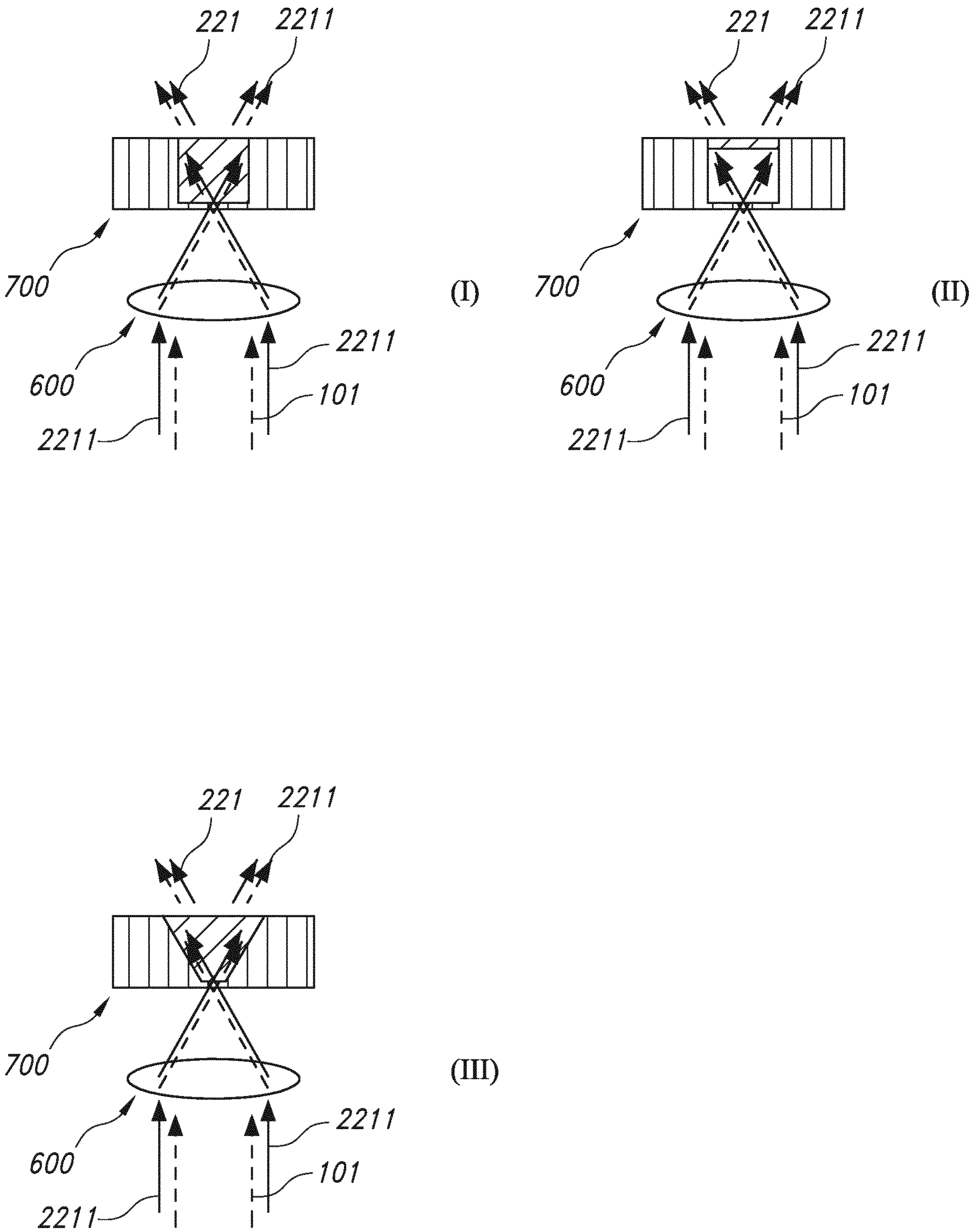
FIGS. 4a-4b schematically depict some further aspects.

Referring to FIG. 4*a*, embodiments I-III, the second luminescent material 220 may be arranged on/in second heat sink 700. In embodiments, the heat sink 700 may comprise a pinhole (embodiment I). In embodiments, the heat sink 700 may comprise a second mixing chamber (embodiments II). In embodiments, the second luminescent material 220 and/or the heat sink 700 may be shaped (embodiment III). Note that such embodiments may also apply to a heat sink 700 in combination with the first luminescent material 210. Further, here the transmissive mode in relation to the second luminescent material 220 is schematically depicted. However, similar embodiments may apply to the reflective mode for the second luminescent material 220 (then a pinhole is not necessary). Likewise, similar embodiments may apply to the reflective mode for the first luminescent material 210.

Figure 4B:
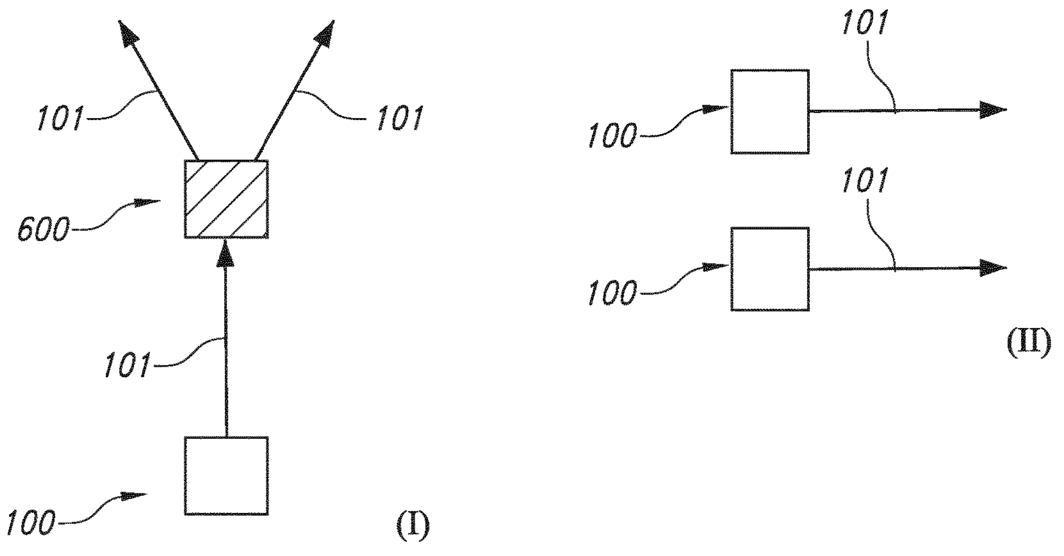

FIG. 4*b* schematically depicts how pump light 101 may be provided along different optical pathways. In the first embodiment, light may be splitted in 2 or more directions with a splitter 600. This may e.g. be fiber optics based, thought other embodiments may also be possible, such as a semi-reflective mirror. For instance, a semi-reflective mirror can be used that may transmit about 50% and reflect about 50% of the pump light 101. In such embodiments, the pump light along the 2 or more directions may essentially have the same optical properties like spectral distribution and peak wavelength. Alternatively, see embodiment II, two or more pump light sources 100 may be applied. In such embodiments, the pump light along the 2 or more directions may in embodiments have the same optical properties like spectral distribution and peak wavelength and may in other embodiments different optical properties like spectral distribution and peak wavelength.

Figure 5:
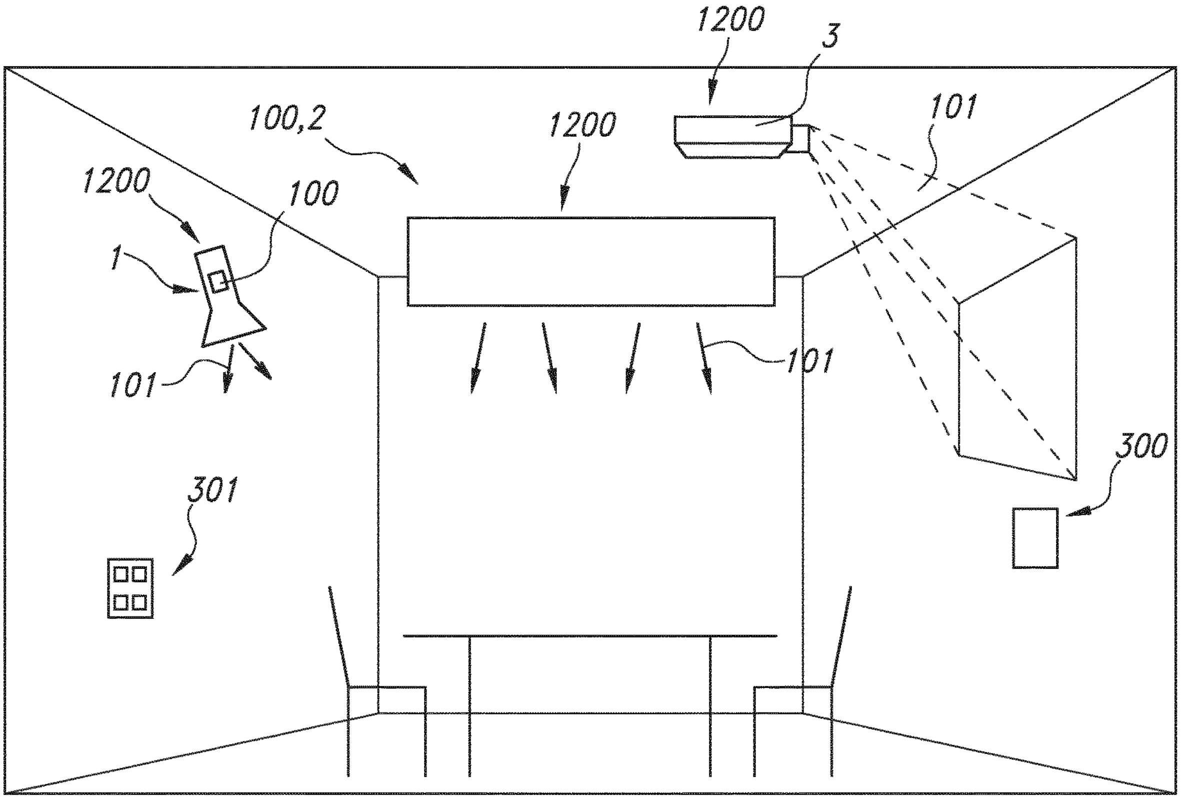
FIG. 5 schematically depict some specific application embodiments.

FIG. 5 schematically depicts an embodiment of a luminaire 2 comprising the light generating system 1000 as described above. Reference 301 indicates a user interface which may be functionally coupled with the control system 300 comprised by or functionally coupled to the light generating system 1000. FIG. 5 also schematically depicts an embodiment of lamp 1 comprising the light generating system 1000. Reference 3 indicates a projector device or projector system, which may be used to project images, such as at a wall, which may also comprise the light generating system 1000.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb "to comprise" and its conjugations does not exclude the presence of elements or steps other than those stated in a claim. Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

The article "a" or "an" preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A light generating system, comprising (i) one or more pump light sources, (ii) a first luminescent material, (iii) a second luminescent material, and (iv) optics, wherein:

the one or more pump light sources are configured to generate pump light source light;

the first luminescent material is configured to convert at least part of the pump light source light into first luminescent material light having a first spectral power distribution; the second luminescent material is configured to convert at least part of the pump light source light into second luminescent material light having a second spectral power distribution, different from the first spectral power distribution; and wherein the spectral power distribution of one of the first luminescent material light and the second luminescent material light overlaps with 5-50% of the spectral power distribution of the other;

the optics comprise a first wavelength dependent optics and a second wavelength dependent optics; wherein the first wavelength dependent optics is configured downstream of the first luminescent material, and configured to spectrally separate the first luminescent material light into a first part of the first luminescent material light and a second part of the first luminescent material light into two directions;

the second wavelength dependent optics is configured downstream of (i) the first wavelength dependent optics and (ii) the second luminescent material; and wherein the second wavelength dependent optics is configured to spectrally combine the first part of the first luminescent material light, the second part of the first luminescent material light, and the second luminescent material light;

wherein the light generating system is configured to generate system light wherein the system light is white light comprising the pump light source light, the first luminescent material light and the second luminescent material light; and wherein (i) the pump light source light comprises one or more pump light wavelengths in the blue spectral region, (ii) the first luminescent material light comprises one or more first luminescent material light wavelengths in one or more of the green and yellow spectral regions, and (iii) the second luminescent material light comprises one or more second luminescent material light wavelengths in the red spectral region; and wherein the first luminescent material is configured in a reflective mode in relation to one or more of the one or more pump light sources, wherein the optics comprise a third wavelength dependent optics configured downstream of (i) the first luminescent material and (ii) the one or more of the one or more pump light sources, and configured upstream of the first wavelength dependent optics, wherein the third wavelength dependent optics is configured to reflect the pump light source light of the one or more of the one or more pump light sources and configured to transmit the first luminescent material light.

2. The light generating system according to claim 1, wherein one or more of the first wavelength dependent optics and the second wavelength dependent optics comprise a dichroic element.

3. The light generating system according to claim 2, wherein the first wavelength dependent optics is transmissive for the first part of the first luminescent material light and reflective for the second part of the first luminescent material light.

4. The light generating system according to claim 2, wherein the second wavelength dependent optics is transmissive for the first part of the first luminescent material light and reflective for the second part of the first luminescent material light and reflective for second luminescent material light.

5. The light generating system according to claim 1, wherein the first luminescent material, the second luminescent material, and the optics are configured such that during operation of the light generating system over at least a part of a pathlength between the second luminescent material and the second optics, the second part of the first luminescent material light and second luminescent material light propagate colinear.

6. The light generating system according to claim 1, wherein the third optics comprises a dichroic element.

7. The light generating system according to claim 1, wherein the second luminescent material is configured in a reflective mode in relation to one or more of the one or more pump light sources.

8. The light generating system according to claim 7, wherein the second wavelength dependent optics is configured downstream of the one or more of the one or more pump light sources, wherein the second wavelength dependent optics is transmissive for the pump light source light of the one or more of the one or more pump light sources.

9. The light generating system according to claim 1, comprising an arrangement comprising the second luminescent material and a fifth optics, wherein the arrangement comprises an arrangement face and a virtual axis perpendicular to the arrangement face, wherein the light generating system is configured to provide the second part of the first luminescent material light is transmitted to the arrangement under a first angle ($\alpha1$) relative to the virtual axis, and wherein the fifth optics is configured to reflect the first luminescent material light under a second angle ($\alpha2$) relative to the virtual axis, wherein $\alpha1 \neq \alpha2$.

10. The light generating system according to claim 1, wherein the one or more pump light sources comprise a first pump light source to irradiate the first luminescent material and a second pump light source to irradiate the second luminescent material.

11. The light generating system according to claim 1, wherein the first luminescent material comprises a luminescent material of the type $A_3B_5O_{12}$:Ce, wherein A comprises one or more of Y, La, Gd, Tb and Lu, and wherein B comprises one or more of Al, Ga, In and Sc.

12. The light generating system according to claim 1, wherein the one or more pump light sources comprise one or more laser light sources, wherein the first luminescent material and the second luminescent material have respective color points that differ with at least 0.1 for u' and/or with at least 0.1 for v', where u' and v' are color coordinate of the light in the CIE 1976 UCS (uniform chromaticity scale) diagram.

13. A light generating device selected from the group of a lamp, a luminaire, a projector device, a disinfection device, and an optical wireless communication device, comprising the light generating system according to claim 1.

14. A light generating system, comprising (i) one or more pump light sources, (ii) a first luminescent material, (iii) a second luminescent material, and (iv) optics, wherein:

the one or more pump light sources are configured to generate pump light source light;

the first luminescent material is configured to convert at least part of the pump light source light into first luminescent material light having a first spectral power distribution;

the second luminescent material is configured to convert at least part of the pump light source light into second luminescent material light having a second spectral power distribution, different from the first spectral power distribution; and wherein the spectral power distribution of one of the first luminescent material light and the second luminescent material light overlaps with 5-50% of the spectral power distribution of the other;

the optics comprise a first wavelength dependent optics and a second wavelength dependent optics; wherein the first wavelength dependent optics is configured downstream of the first luminescent material, and configured to spectrally separate the first luminescent material light into a first part of the first luminescent material light and a second part of the first luminescent material light into two directions;

the second wavelength dependent optics is configured downstream of (i) the first wavelength dependent optics and (ii) the second luminescent material; and wherein the second wavelength dependent optics is configured to spectrally combine the first part of the first luminescent material light, the second part of the first luminescent material light, and the second luminescent material light;

wherein the light generating system is configured to generate system light wherein the system light is white light comprising the pump light source light, the first luminescent material light and the second luminescent material light; and wherein (i) the pump light source light comprises one or more pump light wavelengths in the blue spectral region, (ii) the first luminescent material light comprises one or more first luminescent material light wavelengths in one or more of the green and yellow spectral regions, and (iii) the second luminescent material light comprises one or more second luminescent material light wavelengths in the red spectral region; and wherein the first luminescent material is configured in a transmissive mode in relation to one or more of the one or more pump light sources, wherein the optics comprise a fourth wavelength dependent optics configured downstream of the one or more of the one or more pump light sources, and configured upstream of the first luminescent material, wherein the fourth wavelength dependent optics is configured to transmit the pump light source light of the one or more of the one or more pump light sources and configured to reflect the first luminescent material light.

* * * * *